US011738669B2

United States Patent
Ploch

(10) Patent No.: US 11,738,669 B2
(45) Date of Patent: Aug. 29, 2023

(54) INTERNAL FULL MEMORY SEAT TRACK WITH INTERLOCK

(71) Applicants: Magna Seating Inc, Aurora (CA); Steven Ploch, White Lake, MI (US)

(72) Inventor: Steven Ploch, White Lake, MI (US)

(73) Assignee: Magna Seating Inc., Aurora (CA)

( * ) Notice: Subject to any disclaimer, the term of this patent is extended or adjusted under 35 U.S.C. 154(b) by 283 days.

(21) Appl. No.: 17/045,550

(22) PCT Filed: Apr. 8, 2019

(86) PCT No.: PCT/US2019/026324
§ 371 (c)(1),
(2) Date: Oct. 6, 2020

(87) PCT Pub. No.: WO2019/195834
PCT Pub. Date: Oct. 10, 2019

(65) Prior Publication Data
US 2021/0155126 A1   May 27, 2021

Related U.S. Application Data

(60) Provisional application No. 62/653,574, filed on Apr. 6, 2018.

(51) Int. Cl.
*B60N 2/12* (2006.01)
*B60N 2/90* (2018.01)
(Continued)

(52) U.S. Cl.
CPC ............ *B60N 2/3011* (2013.01); *B60N 2/123* (2013.01); *B60N 2/0818* (2013.01); *B60N 2/3065* (2013.01);
(Continued)

(58) Field of Classification Search
CPC ... B60N 2/146; B60N 2/123; B60N 2002/948
See application file for complete search history.

(56) References Cited

U.S. PATENT DOCUMENTS

| 5,626,392 A * | 5/1997 | Bauer | B60N 2/0705 297/378.12 |
| 7,025,419 B2 * | 4/2006 | Sasaki | B60N 2/0825 297/378.12 |

(Continued)

FOREIGN PATENT DOCUMENTS

| EP | 2571718 | 3/2013 |
| WO | 2010066053 | 6/2010 |

(Continued)

*Primary Examiner* — Timothy J Brindley
(74) *Attorney, Agent, or Firm* — Miller Canfield

(57) ABSTRACT

A seat assembly secured to a floor in an automotive vehicle has a seat cushion, a seat back, a seat track assembly, a latch mechanism, a memory mechanism, and an interlock assembly. The seat back is operatively coupled to the seat cushion, and is movable between an upright position and a folded position. The seat track assembly includes a fixed track adapted to be fixedly secured to the floor and a movable track fixedly secured to the seat cushion. The movable track is slidably coupled to the fixed track. The latch mechanism is operatively coupled between the fixed and movable tracks. The latch mechanism prevents sliding movement of the movable track, and is (17) selectively unlocked from the fixed track to allow sliding movement of the seat cushion between a plurality of positions. The memory mechanism is operable between a home position and a memory position. In the home position, the memory mechanism is coupled and moves with the movable track. In the memory position, the memory mechanism is coupled with the fixed track and defines a previously selected one of the plurality of positions. The interlock assembly comprises a hook lever, an interlock lever, and a cable. The hook lever is pivotally connected to the seat cushion. The interlock lever is pivotally coupled to the movable track for movement between a disengaged position and an engaged position. The cable is operatively coupled between the hook lever and the interlock lever, and is configured for moving the hook lever into and out of engagement with the seat back. Moving the seat back to the folded position actuates the memory mechanism to the memory position, which unlocks the latch mechanism from the fixed track to allow sliding movement of the seat cushion in a first direction away from the previously selected (Continued)

one of the plurality of positions to the easy-entry position. Actuation of the memory mechanism to the memory position also allows the interlock lever to rotate into the engaged position to cause the cable to move the hook lever into engagement with the seat back to maintain the seat back in the folded position.

8 Claims, 15 Drawing Sheets

(51) Int. Cl.
  *B60N 2/30* (2006.01)
  *B60N 2/08* (2006.01)
(52) U.S. Cl.
  CPC .... *B60N 2002/948* (2018.02); *B60N 2205/35* (2013.01)

(56) References Cited

U.S. PATENT DOCUMENTS

| | | | |
|---|---|---|---|
| 8,967,719 B2* | 3/2015 | Ngiau | B60N 2/123 |
| | | | 297/378.12 |
| 10,252,644 B2* | 4/2019 | Aktas | B60N 2/20 |
| 2004/0070250 A1 | 4/2004 | Cooley et al. | |
| 2004/0262969 A1 | 12/2004 | Sasaki et al. | |
| 2013/0278033 A1 | 10/2013 | Tame et al. | |

FOREIGN PATENT DOCUMENTS

| | | |
|---|---|---|
| WO | 2011143758 | 5/2011 |
| WO | 2012071659 | 6/2012 |

* cited by examiner

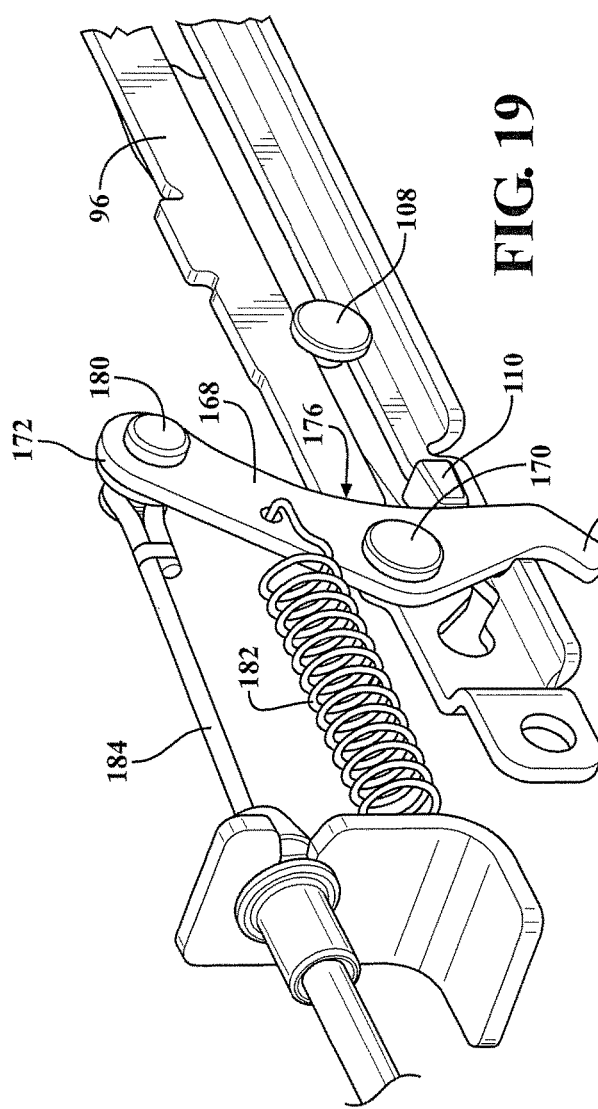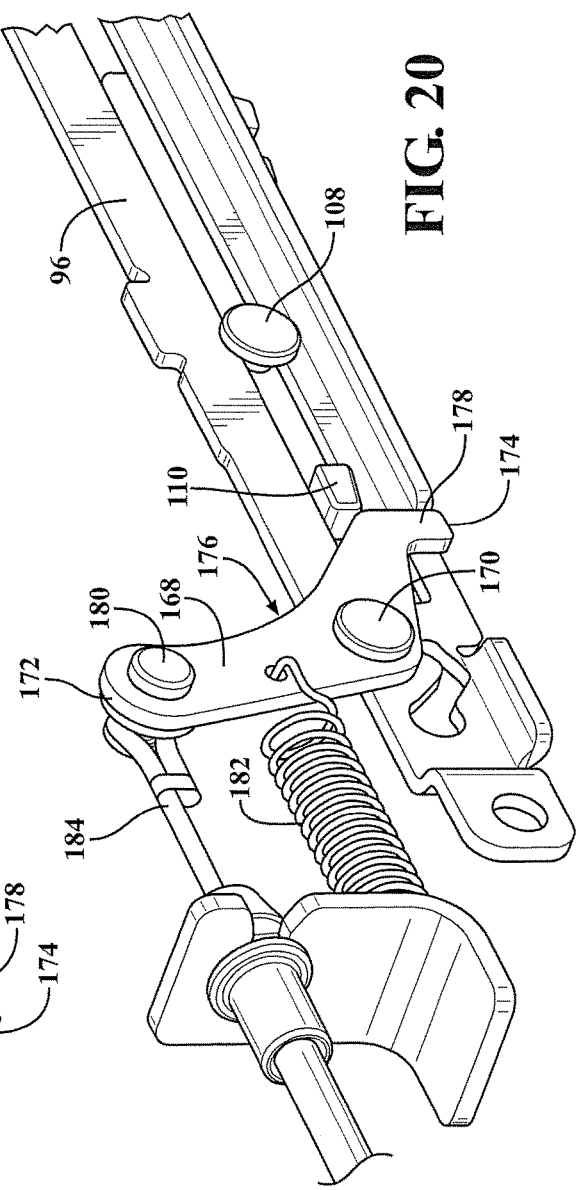

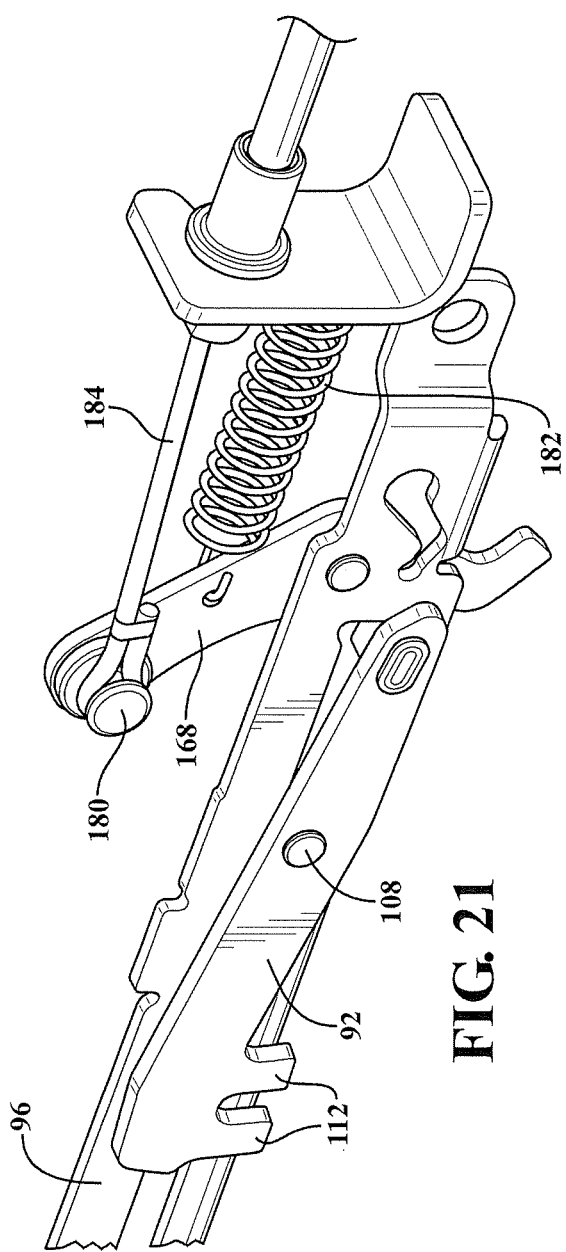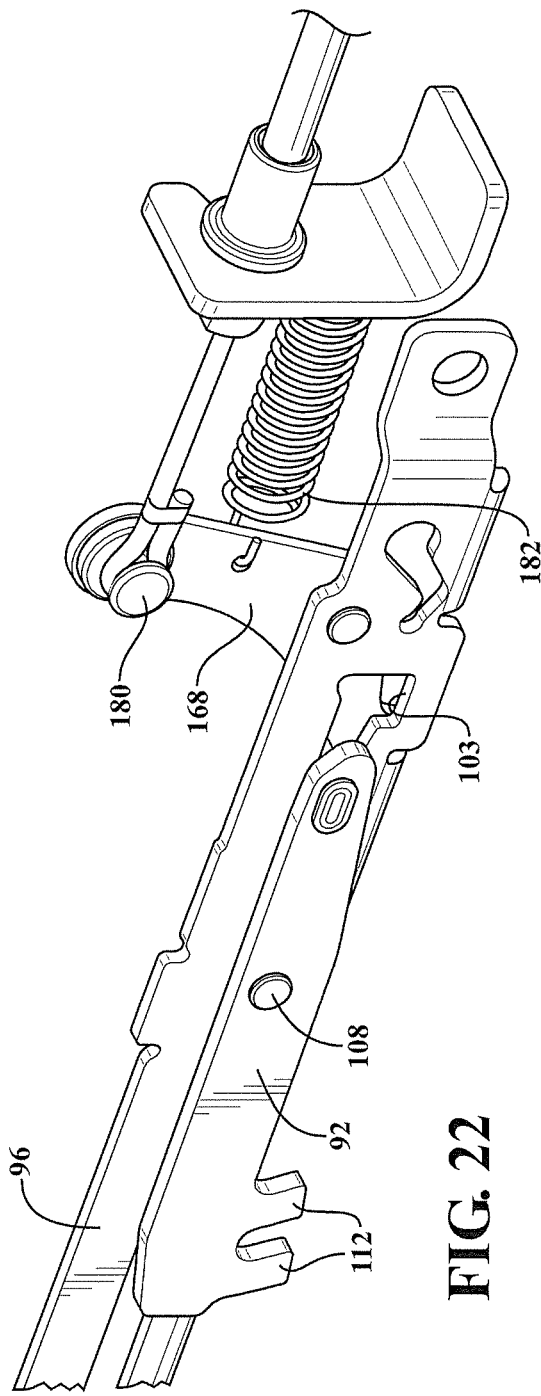

INTERNAL FULL MEMORY SEAT TRACK WITH INTERLOCK

CROSS-REFERENCE TO RELATED APPLICATIONS

This application claims priority to U.S. provisional patent application No. 62/653,574, filed Apr. 6, 2018, which is incorporated herein by reference.

TECHNICAL FIELD

The present invention relates to a seat track assembly for a seat assembly in an automotive vehicle. More particularly, the present invention relates to a seat track assembly allowing sliding movement of a seat assembly to an easy-entry position and including a full memory mechanism for returning the seat assembly to a previously selected seating position.

BACKGROUND

Automotive vehicles include seat assemblies for supporting occupants within the vehicle. A typical seat assembly includes a seat cushion and a seat back operatively coupled to the seat cushion by a recliner mechanism for allowing selective pivotal adjustment of the seat back relative to the seat cushion between a plurality of reclined seating positions. Oftentimes, the seat back is also movable to a forwardly inclined or dumped position to allow easier ingress and egress to a rear seat assembly or storage area located behind the seat assembly.

It is common for the seat assembly to include a seat track assembly that slidably interconnects the seat assembly to, a floor of the vehicle. The seat track assembly provides longitudinal sliding adjustment of the seat assembly along the floor between a plurality of fore/aft seating positions. The seat track assembly typically includes a lower or fixed track mounted to the floor of the vehicle and an upper or movable track slidably engaging the fixed track. The movable track is mounted to a bottom surface of the seat cushion for sliding movement of the seat assembly along the fixed track. A locking mechanism operatively coupled between the movable and fixed tracks selectively locks the movable track relative to the fixed track to prevent sliding movement of the seat assembly.

It is also common for the seat assembly to include a Bowden-type cable operatively coupling the seat back to the locking mechanism such that when the seat back is pivoted to the dumped position, the locking mechanism unlocks the movable track from the fixed track. The seat assembly may then be biased forward along the fixed track from a previously selected fore/aft seating position to an easy-entry position, forward of the plurality of fore/aft seating positions, to improve ingress and egress to the rear seat assembly or storage area. When access to the rear seat assembly or storage area is no longer required, the seat assembly is returned rearward along the fixed track toward the plurality of fore/aft seating positions. Typically, however, the seat assembly does not return to the previously selected fore/aft seating position. Rather, the seat assembly returns to a predefined fore/aft seating position and an occupant must then readjust the seat assembly to the previously selected fore/aft seating position.

It is desirable, therefore, to provide a seat track assembly that provides longitudinal sliding adjustment of a seat assembly between a plurality of fore/aft seating positions and an easy-entry position. It is further desirable that the seat track assembly relocate the seat assembly in the previously selected fore/aft seating position when returned from the easy-entry position.

SUMMARY

According to one embodiment, there is provided a seat assembly secured to a floor in an automotive vehicle. The seat assembly comprises a seat cushion, a seat back, a seat track assembly, a latch mechanism, a memory mechanism, and an interlock assembly. The seat back is operatively coupled to the seat cushion, and is movable between an upright position and a folded position. The seat track assembly includes a fixed track adapted to be fixedly secured to the floor and a movable track fixedly secured to the seat cushion. The movable track is slidably coupled to the fixed track. The latch mechanism is operatively coupled between the fixed and movable tracks. The latch mechanism prevents sliding movement of the movable track, and is selectively unlocked from the fixed track to allow sliding movement of the seat cushion between a plurality of positions. The memory mechanism is operable between a home position and a memory position. In the home position, the memory mechanism is coupled and moves with the movable track. In the memory position, the memory mechanism is coupled with the fixed track and defines a previously selected one of the plurality of positions. The interlock assembly comprises a hook lever, an interlock lever, and a cable. The hook lever is pivotally connected to the seat cushion. The interlock lever is pivotally coupled to the movable track for movement between a disengaged position and an engaged position. The cable is operatively coupled between the hook lever and the interlock lever, and is configured for moving the hook lever into and out of engagement with the seat back. Moving the seat back to the folded position actuates the memory mechanism to the memory position, which unlocks the latch mechanism from the fixed track to allow sliding movement of the seat cushion in a first direction away from the previously selected one of the plurality of positions to the easy-entry position. Actuation of the memory mechanism to the memory position also allows the interlock lever to rotate into the engaged position to cause the cable to move the hook lever into engagement with the seat back to maintain the seat back in the folded position.

BRIEF DESCRIPTION OF THE DRAWINGS

Advantages of the present invention will be readily appreciated as the same becomes better understood by reference to the following detailed description when considered in connection with the accompanying drawings wherein:

FIG. 19 is an inner perspective view of the guide bracket, memory plate in the home position and interlock lever in the disengaged position;

FIG. 20 is an inner perspective view of the guide bracket, memory plate in the memory position and interlock lever in the engaged position;

FIG. 21 is an outer perspective view of the guide bracket, memory plate in the home position and interlock lever in the disengaged position; and FIG. 22 is an outer perspective view of the guide bracket, memory plate in the memory position and interlock lever in the engaged position.

DETAILED DESCRIPTION OF EXAMPLE EMBODIMENTS

Figure 1:
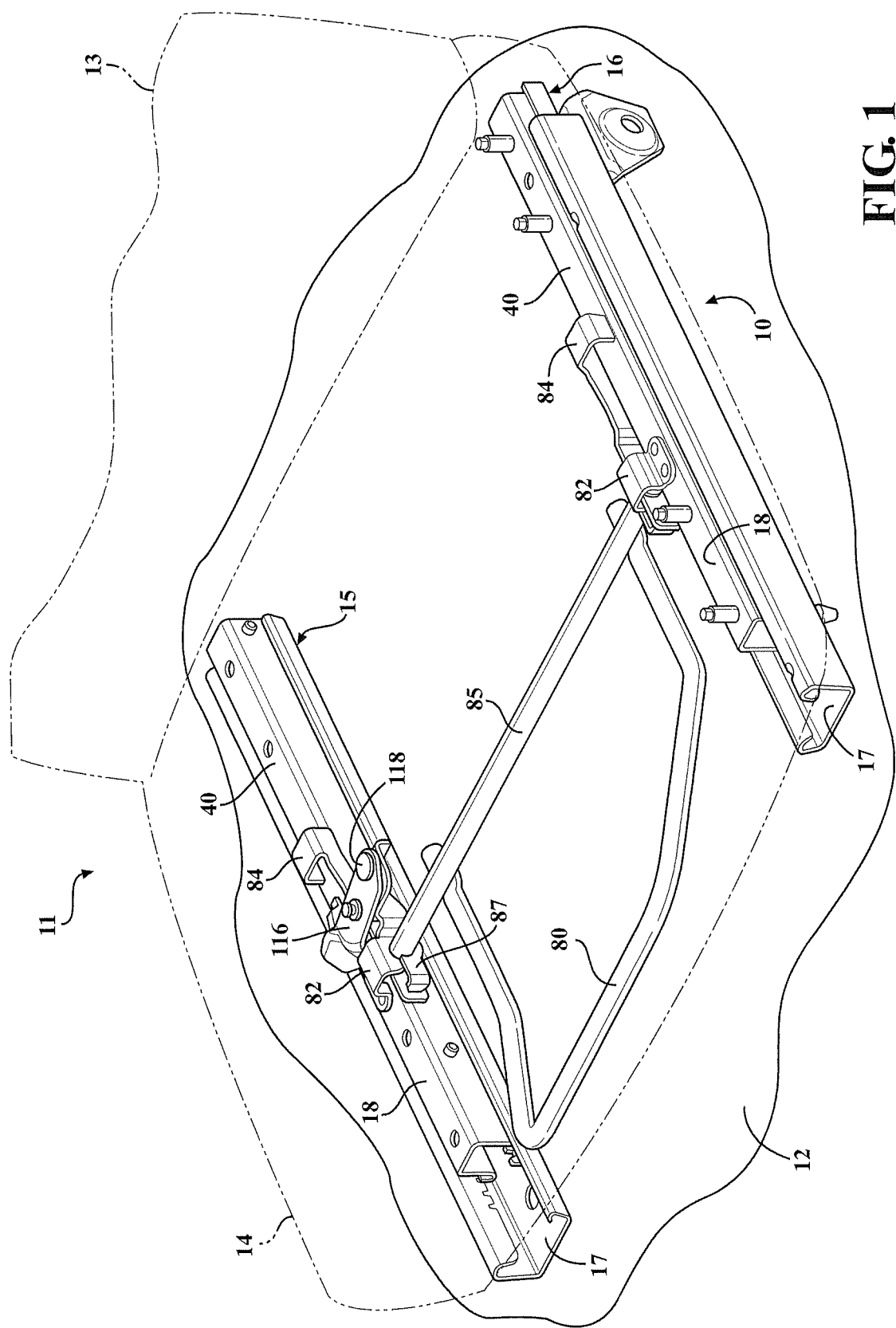
FIG. 1 is a perspective view of a seat assembly including a seat track mechanism having a pair of seat track assemblies.

Referring to the Figures, a seat track mechanism, generally shown at 10, operably interconnects a seat assembly 11 to a floor 12 in an automotive vehicle. As is well known in the vehicle seating art, the seat assembly 11 includes a seat back 13 operatively coupled to a seat cushion 14 allowing selective pivotal adjustment of the seat back 13 relative to the seat cushion 14 between a plurality of reclined seating positions. The seat back 13 is also pivotally movable to a forwardly folded or dumped position to allow easier ingress and egress to a rear seat assembly or storage area located behind the seat assembly 11. The seat track mechanism 10 includes a primary seat track assembly 15 and a secondary seat track assembly 16 which are laterally spaced apart. The primary 15 and secondary 16 seat track assemblies allow selective longitudinal sliding adjustment of the seat assembly 11 among a plurality of fore/aft seating positions along the floor 12 of the vehicle. The primary 15 and secondary 16 seat track assemblies also allow sliding movement of the seat assembly 11 to an access or easy-entry position corresponding with a forward-most position of the plurality of fore/aft seating positions. The easy-entry position may also be further forward than the forward-most fore/aft seating position. When the seat back 13 is pivoted to the dumped position, it is contemplated that the seat assembly will automatically slide forward from a previously selected fore/aft seating position to the easy-entry position. The primary 15 and secondary 16 seat track assemblies are similar, however, only the primary seat track assembly 15 will be described in detail.

The primary seat track assembly 15 includes a lower or fixed track 17 and an upper or movable track 18. The fixed track 17 is adapted to be mounted or fixedly secured to the floor 12 by front and rear risers (not shown). The movable track 18 is adapted to be fixedly secured to an underside of the seat cushion 14 and is slidably coupled to the fixed track 17 for longitudinal sliding movement relative thereto. Thus, when the movable track 18 is caused to slide, the seat assembly 11 moves with it and can be adjusted among the plurality of fore/aft seating positions along the floor 12 of the vehicle.

Figure 2:
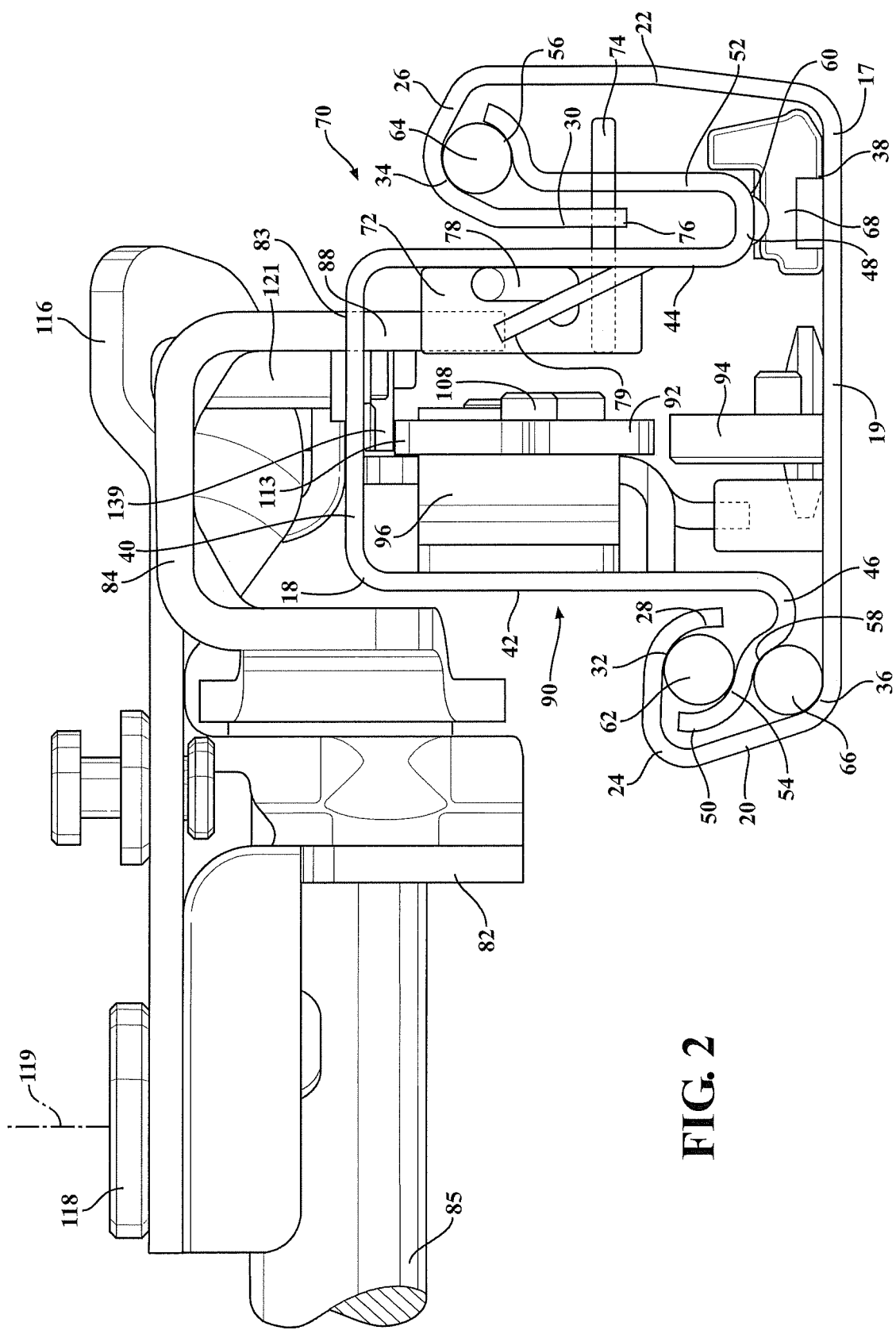
FIG. 2 is a rearward end view of a primary seat track assembly according to an embodiment of the invention.
Figure 3:
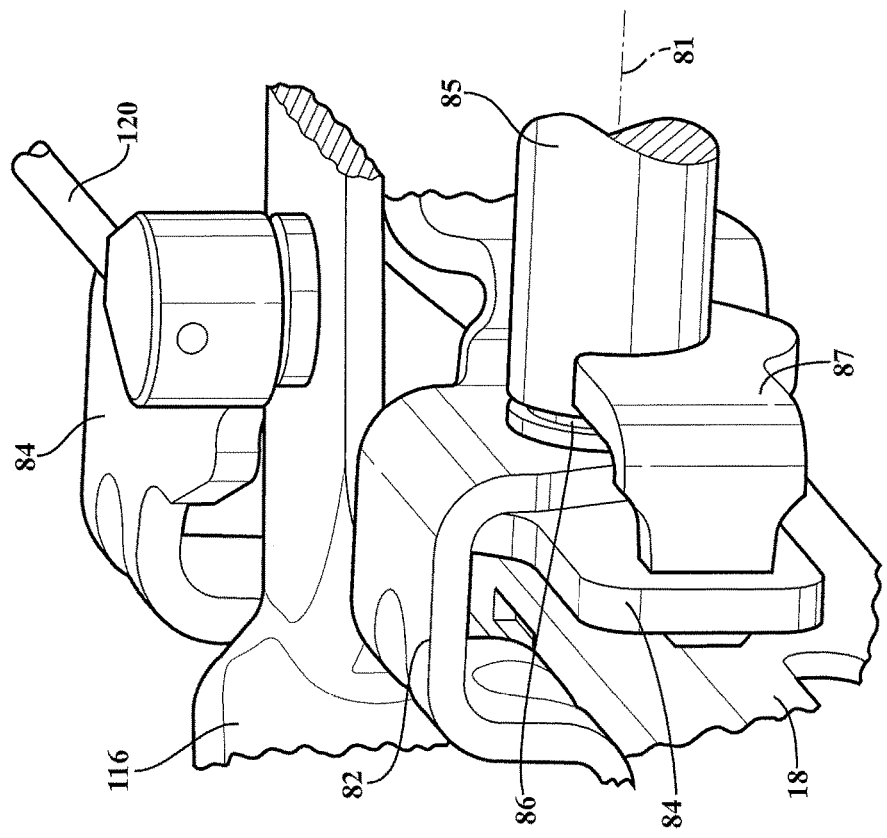
FIG. 3 is a fragmentary, inner perspective view of a portion of the primary seat track assembly.

The profiles or cross-sections of the fixed 17 and movable tracks 18 are described in detail below. However, it is appreciated that any number of track cross-sections could be used without varying from the scope of the invention. Referring to FIG. 2, the fixed track 17 has a generally U-shaped cross-section that is defined by a horizontal lower portion 19 extending laterally between vertical outer side walls 20, 22. The outer side walls 20, 22 each include an end portion 24, 26 extending laterally inward therefrom and terminating at a downward extending flange 28, 30. Each one of the end portions 24, 26 defines a downward-facing bearing surface 32, 34 extending longitudinally along the fixed track 17. In addition, the lower portion 19 defines upward-facing bearing surfaces 36, 38 generally adjacent to each one of the outer side walls 20, 22 and extending longitudinally along the fixed track 17.

The movable track 18 has a generally U-shaped cross-section that is inverted relative to the fixed track 17 and is defined by a horizontal upper portion 40 spaced apart from the lower portion 19 of the fixed track 17 and extending laterally between vertical inner side walls 42, 44. The inner side walls 42, 44 each include an end portion 46, 48 extending laterally outward therefrom and terminating at an upward extending flange 50, 52. The inner side walls 42, 44 of the movable track 18 interlock with the outer side walls 20, 22 of the fixed track 17. More specifically, the upward extending flanges 50, 52 of the inner side walls 42, 44 are nested within the end portions 24, 26 of the fixed track 17 for sliding engagement of the movable track 18 with the fixed track 17. Each one of the upward extending flanges 50, 52 defines an upward-facing bearing surface 54, 56 extending longitudinally along the movable track 18. In addition, each one of the end portions 46, 48 defines a downward-facing bearing surface 58, 60 extending longitudinally along the movable track 18.

The upward-facing bearing surfaces 54, 56 of the movable track 18 are in opposing relation to the downward-facing bearing surfaces 32, 34 of the fixed track 17 and pluralities of roller bearings 62, 64 are disposed therebetween to provide smooth forward and rearward sliding movement of the movable track 18 relative to the fixed track 17. Similarly, the downward-facing bearing surface 58 of the movable track 18 is in opposing relation to the upward-facing bearing surface 36 of the fixed track 17 and a plurality of roller bearings 66 is disposed therebetween to provide smooth forward and rearward sliding movement of the movable track 18 relative to the fixed track 17. Further, the downward-facing bearing surface 60 of the movable track 18 is in opposing relation to the upward-facing bearing surface 38 of the fixed track 17 and a roller mechanism 68 is disposed therebetween to provide smooth forward and rearward sliding movement of the movable track 18 relative to the fixed track 17.

The primary seat track assembly 15 includes a latch mechanism, generally shown at 70, for selectively locking the seat assembly in any one of the plurality of fore/aft seating positions. More specifically, the latch mechanism 70 is operatively coupled to the movable track 18 and selectively locks the movable track 18 with the fixed track 17 to prevent forward and rearward sliding movement of the movable track 18 relative to the fixed track 17. The latch mechanism 70 is disposed generally within a space defined between the lower portion 19 of the fixed track 17 and the upper portion 40 of the movable track 18. The latch mechanism 70 includes a latch body 72 that is operatively coupled to an inner surface of the inner side wall 44 of the movable track 18 and is operable between a locked position, shown in FIG. 2, and an unlocked position. A loop latch 74 extends laterally through the inner side wall 44 and the upward extending flange 52 of the movable track 18 and is adapted for engaging a plurality of downward-facing latching teeth 76 spaced longitudinally along the downward extending flange 30 of the fixed track 17. A leaf spring 78 extends longitudinally through the latch body 72 and is coupled to the inner surface of the inner side wall 44 of the movable track 18 at opposite ends by tabs 79 on the movable track 18. The leaf spring 78 biases the latch body 72 upward towards the locked position, shown in FIG. 2, wherein the loop latch 74 engages the latching teeth 76 on the fixed track 17, thereby locking the movable track 18 with the fixed track 17.

The latch body 72 is moved downward, against the bias of the leaf spring 78, to disengage the loop latch 74 from the latching teeth 76 in response to actuating a towel bar 80. More specifically, a mounting bracket 82 is fixedly secured to an upper surface of the upper portion 40 of the movable track 18 and a latch release lever 84 is pivotally coupled to the mounting bracket 82 at pivot 86, which defines a first laterally extending axis 81. The latch release lever 84 includes an arm 88 that extends through an opening 83 in the upper portion 40 of the movable track 18 and is adapted for engaging the latch body 72. The towel bar 80 is coupled to a cross bar 85 that rotates about the first axis 81. The cross bar 85 includes a connecting bracket 87 that connects the cross bar 85 to the latch release lever 84. The towel bar 80 is accessible to a seat occupant at the underside of a forward end of the seat cushion 14. When the towel bar 80 is lifted the latch release lever 84 pivots about pivot 86 and the arm 88 pushes the latch body 72 downward towards the unlocked position, wherein the loop latch 74 is disengaged from the latching teeth 76 of the fixed track 17, thereby unlocking the movable track 18 from the fixed track 17.

Figure 6:
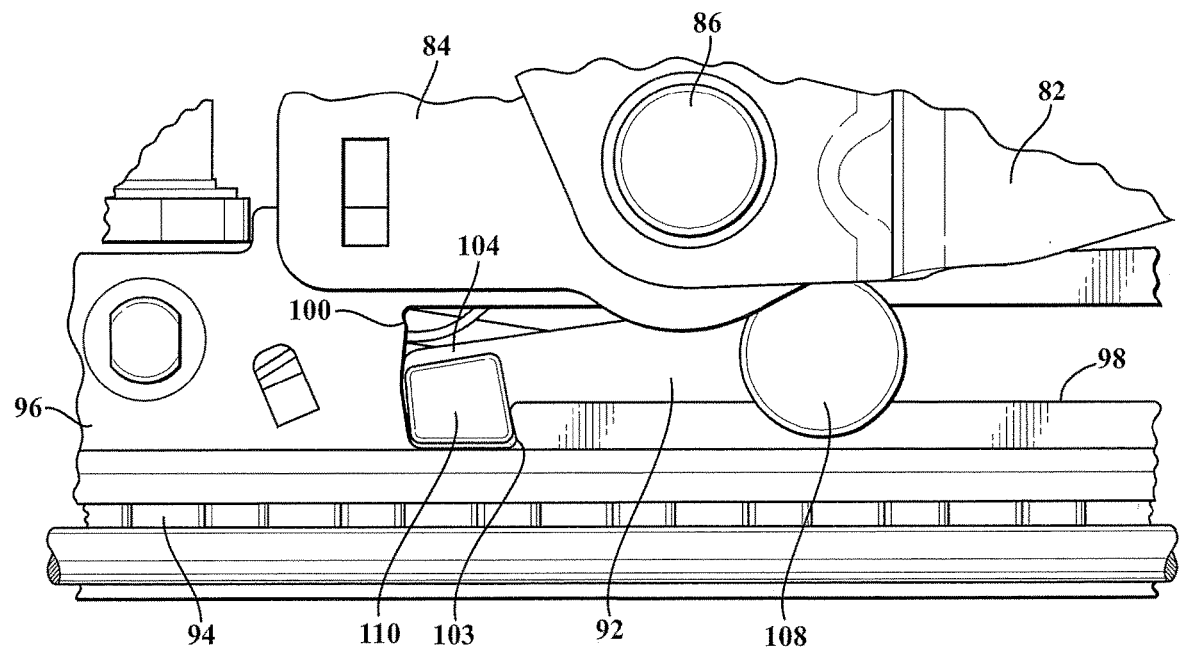
FIG. 6 is a fragmentary, partially cut-away, inner side view of the primary seat track assembly illustrating a memory tab disposed in a recess on the guide bracket.

The primary seat track assembly 15 also includes a memory mechanism, generally shown at 90, which allows the seat assembly 11 to return to the previously selected fore/aft seating position after the seat assembly 11 is moved to the easy-entry position. The memory mechanism 90 includes a memory plate 92 that selectively engages a tooth rack 94 to identify the previously selected fore/aft seating position. The tooth rack 94 extends longitudinally along the lower portion 19 of the fixed track 17 and is fixedly secured thereto. A guide bracket 96 extends longitudinally and is fixedly secured to an inner surface of the inner side wall 42 of the movable track 18. The guide bracket 96 includes a guide slot 98 extending longitudinally between a forward end 100 and a rearward end 102. A recess 103 at the forward end 100 of the guide slot 98 extends downward therefrom, as shown in FIG. 6. The memory plate 92 is disposed laterally between the guide bracket 96 and the latch body 72. The memory plate 92 extends longitudinally between a front end 104 and a rear end 106 and is pivotally and slidably coupled to the guide slot 98 by a pin 108 located between the front 104 and rear 106 ends thereof. The pin 108 defines a second laterally extending axis 109. A memory tab 110 extends laterally from the front end 104 of the memory plate 92 and is disposed in the guide slot 98. A pair of memory teeth 112 extends downward from the rear end 106 of the memory plate 92 and is adapted for engagement with the tooth rack 94. A flag tab 113 extends upward from the rear end 106 of the memory plate 92, the purpose of which is described below.

Figure 4:
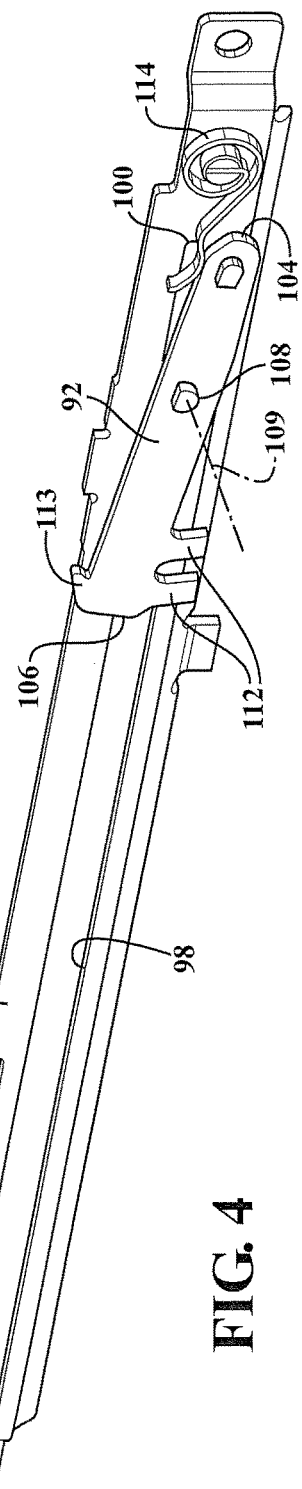
FIG. 4 is an outer perspective view of a guide bracket and a memory plate in a home position.
Figure 5:
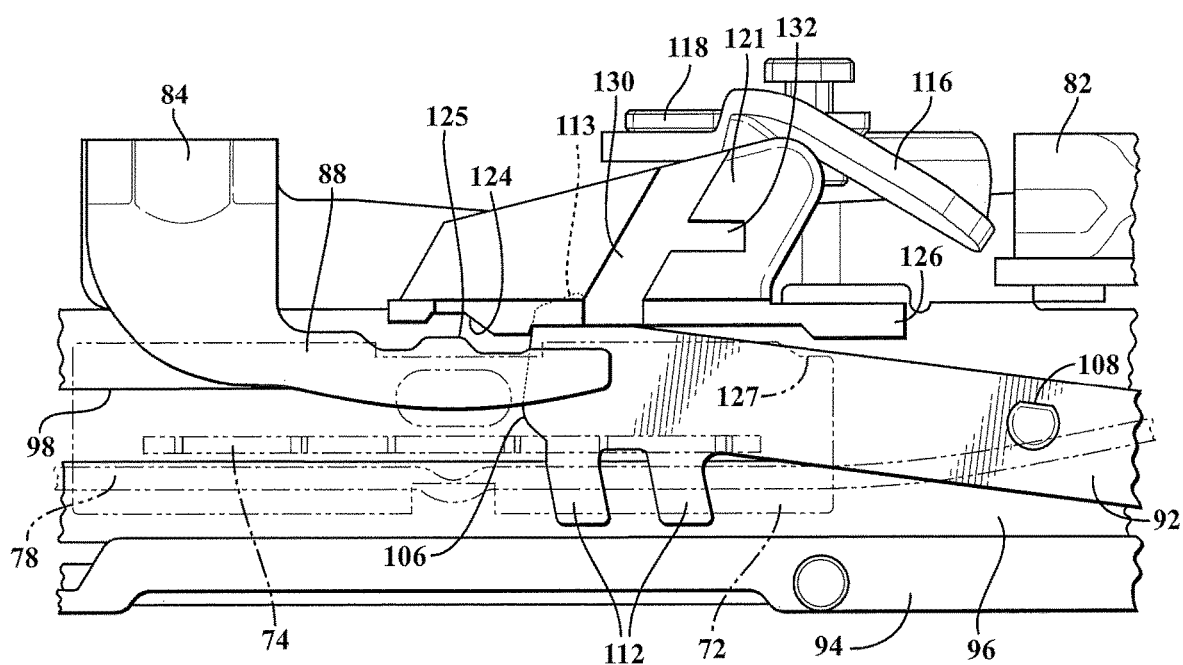
FIG. 5 is a fragmentary, partially cut-away, outer side view of the primary seat track assembly illustrating a slider in a raised position, a latch body in a locked position, and the memory plate in the home position.
Figure 10:
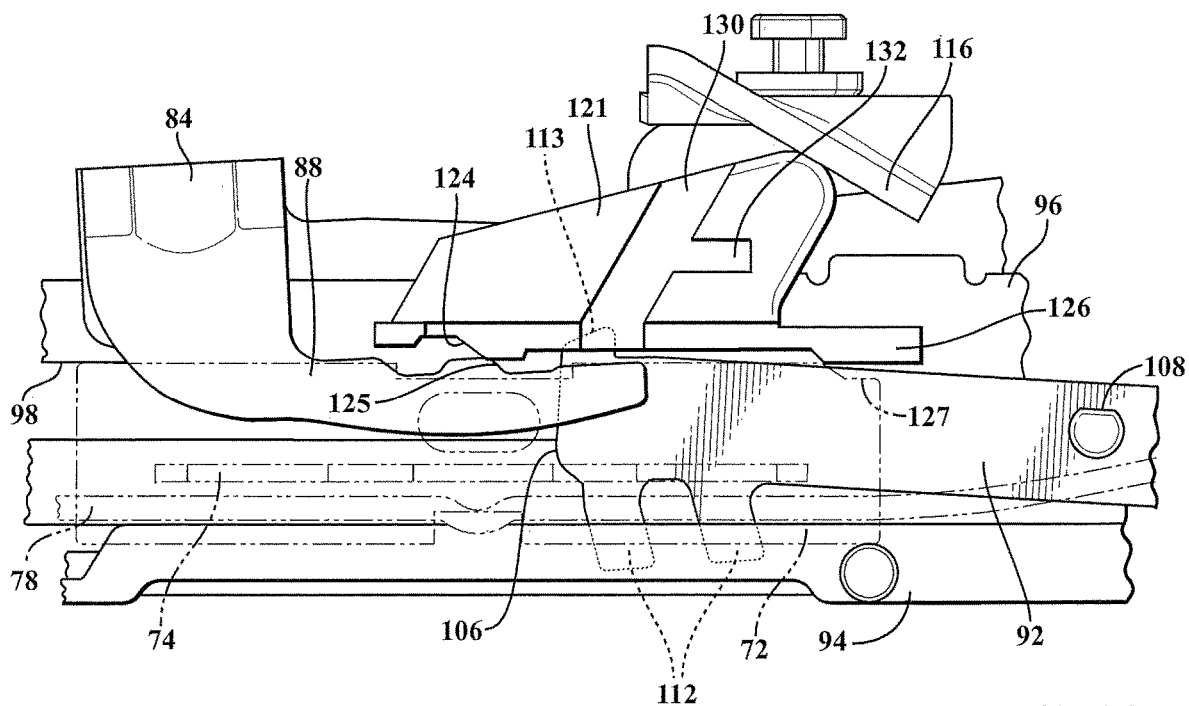
FIG. 10 is a fragmentary, partially cut-away, outer side view of the primary seat track assembly illustrating the slider in a depressed position, the latch body in an unlocked position, and the memory plate in a memory position.
Figure 11:
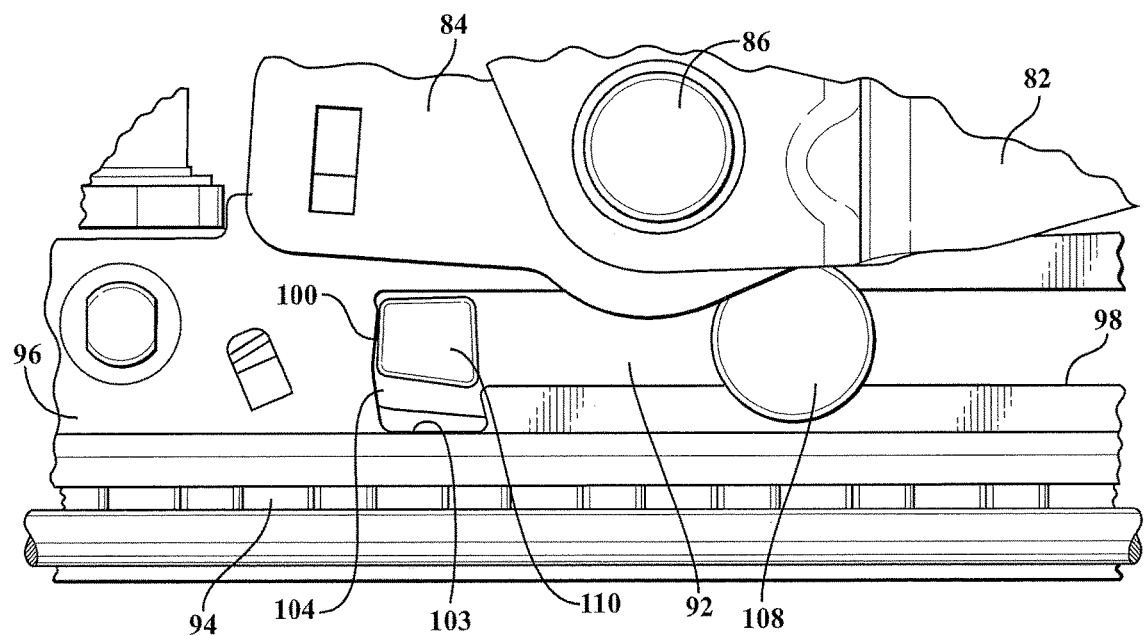
FIG. 11 is a fragmentary, partially cut-away, inner side view of the primary seat track assembly illustrating the memory tab withdrawn from the recess on the guide bracket.

The memory plate 92 pivots about pin 108 between a home position, shown in FIGS. 5 and 6, and a memory position, shown in FIGS. 10 and 11. The memory plate 92 is biased to the home position by a coil spring 114, shown in FIG. 4, that is mounted to the guide bracket 96 adjacent to the forward end 100 of the guide slot 98. The coil spring 114 is adapted to engage the front end 104 of the memory plate 92 to bias the memory tab 110 downward into the recess 103. In the home position, the memory tab 110 is disposed in the recess 103 on the guide bracket 96 and the memory teeth 112 are disengaged from the tooth rack 94. In other words, when the memory plate 92 is in the home position, the memory plate 92 is coupled with the guide bracket 96 and therefore travels with the movable track 18 during sliding movement of the movable track 18 relative to the fixed track 17. Thus, the seat assembly 11 is movable between the plurality of fore/aft seating positions.

Figure 13:
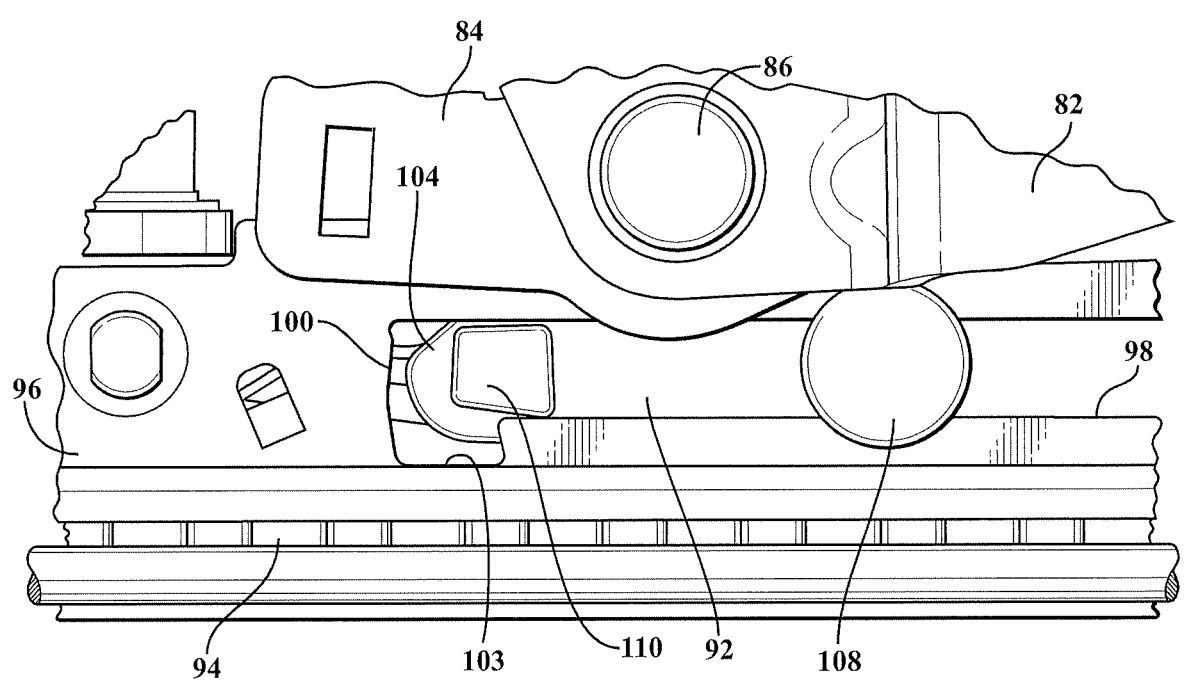
FIG. 13 is a fragmentary, partially cut-away, inner side view of the primary seat track assembly illustrating the memory plate in the memory position and the memory tab trapped in a guide slot on the guide bracket.

In the memory position, the memory tab 110 is withdrawn from the recess 103 on the guide bracket 96 and the memory teeth 112 are engaged with the tooth rack 94 to identify the previously selected fore/aft seating position of the seat assembly 11. With the memory plate 92 in the memory position, the guide bracket 96 and the movable track 18 slide relative to the memory plate 92. In other words, when the memory plate 92 is in the memory position, the memory plate 92 is coupled with the tooth rack 94 and therefore does not travel with the movable track 18 during sliding movement of the movable track 18 relative to the fixed track 17. Thus, the seat assembly 11 is movable between the previously selected fore/aft seating position and the easy-entry position. Further, as shown in FIG. 13, when the memory plate 92 is in the memory position the memory tab 110 is trapped in the guide slot 98 during sliding movement of the movable track 18 as the seat assembly 11 moves between the previously selected fore/aft seating position and the easy-entry position. Thus, the memory plate 92 remains in the memory position until the memory tab 110 returns to the recess 103.

Figure 7:
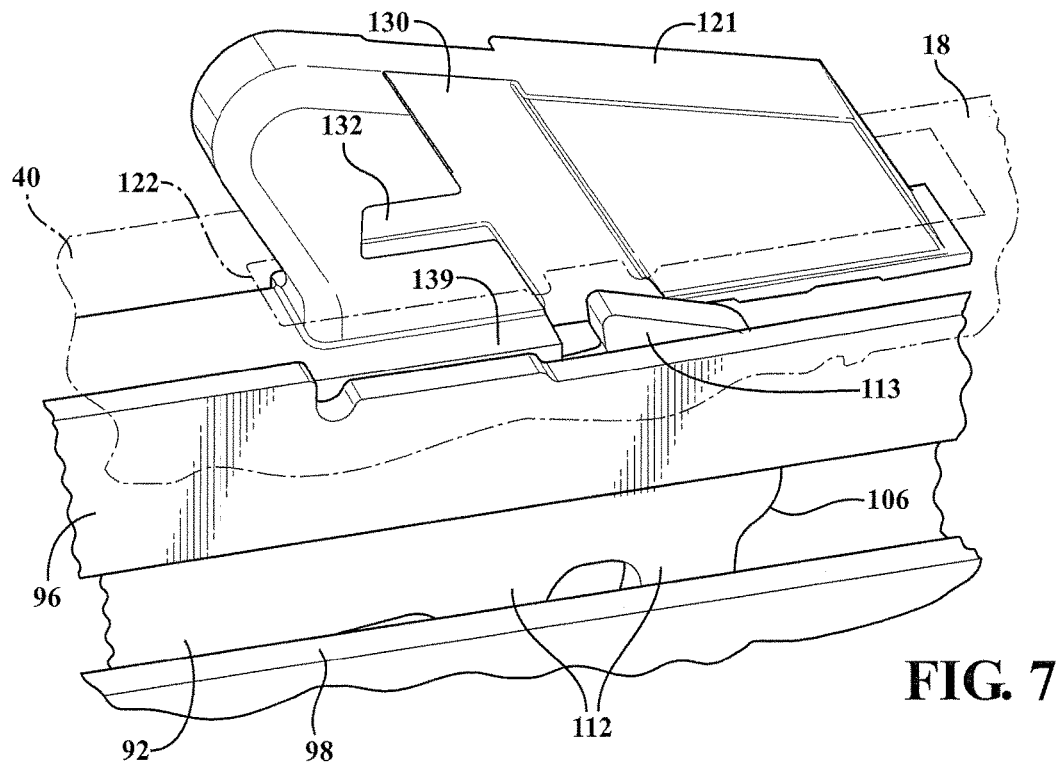
FIG. 7 is a fragmentary, inner perspective view of the primary seat track assembly illustrating the slider in the raised position and the memory plate in the home position.
Figure 12:
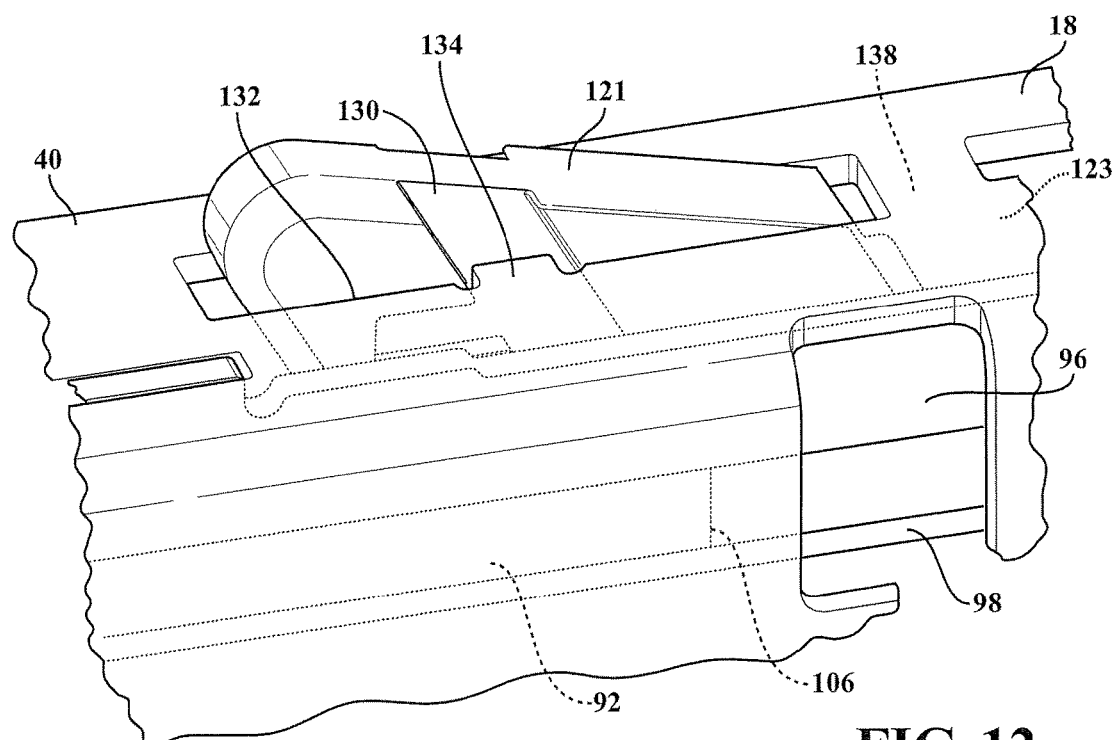
FIG. 12 is a fragmentary, inner perspective view of the primary seat track assembly illustrating the slider in the depressed position.

The memory plate 92 is pivoted from the home position to the memory position in response to pivoting the seat back 13 from one of the reclined seating positions to the dumped position. More specifically, a cam lever 116 is pivotally coupled to the mounting bracket 84 at pivot 118, which defines a vertically extending axis 119. A first Bowden-type cable 120 is operatively coupled between the seat back 13 and the cam lever 116 such that pivoting the seat back 13 to the dumped position causes the cam lever 116 to pivot in a first direction about pivot 118. As the cam lever 116 pivots in the first direction, the cam lever 116 pushes a slider 121 downward and rearward from a raised position, shown in FIG. 7, to a depressed position, shown in FIG. 12. The slider 121 extends through an opening 122 in the upper portion 40 of the movable track 18 and is adapted to contact the memory plate 92 and the arm 88 of the latch release lever 84. When the memory plate 92 is in the home position, the rear end 106 of the memory plate 92 is in contact with an underside of the slider 121 and maintains the slider 121 in the raised position. As the cam lever 116 pushes the slider 121 from the raised position to the depressed position, the slider 121 pushes against the rear end 106 of the memory plate 92 and pivots the memory plate 92 from the home position to the memory position.

Figure 8:
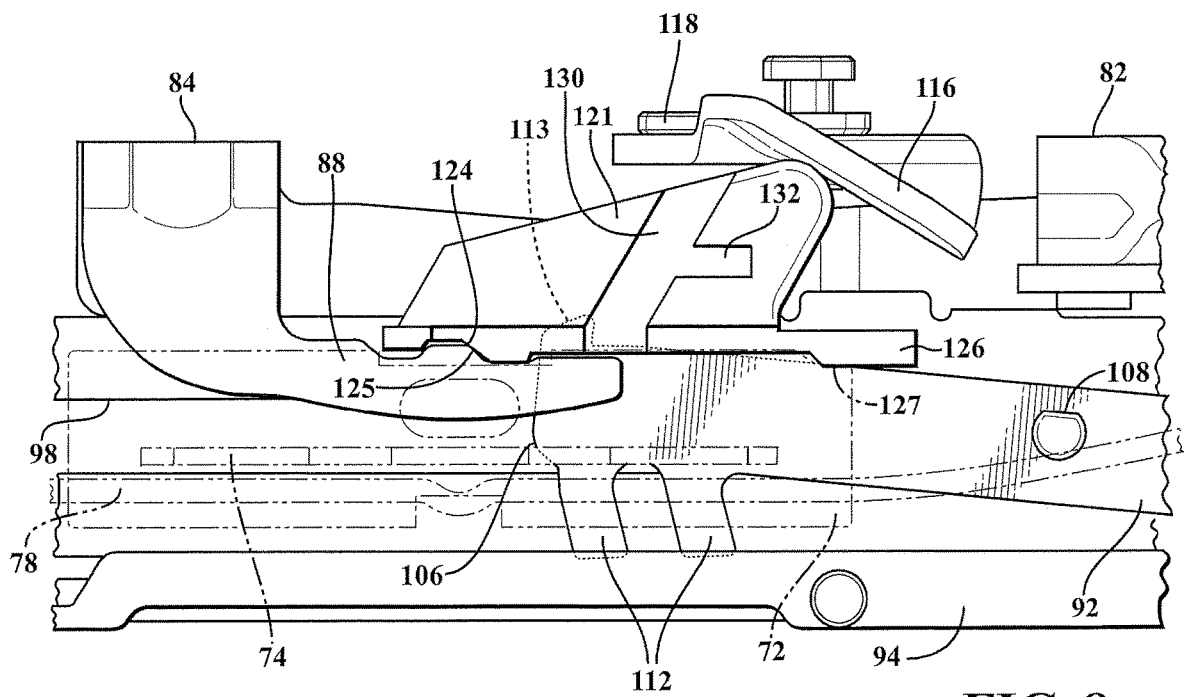
FIG. 8 is a fragmentary, partially cut-away, outer side view of the primary seat track assembly illustrating the slider in a partially depressed position, the latch body in the locked position, and the memory plate in a partially pivoted position.
Figure 9:
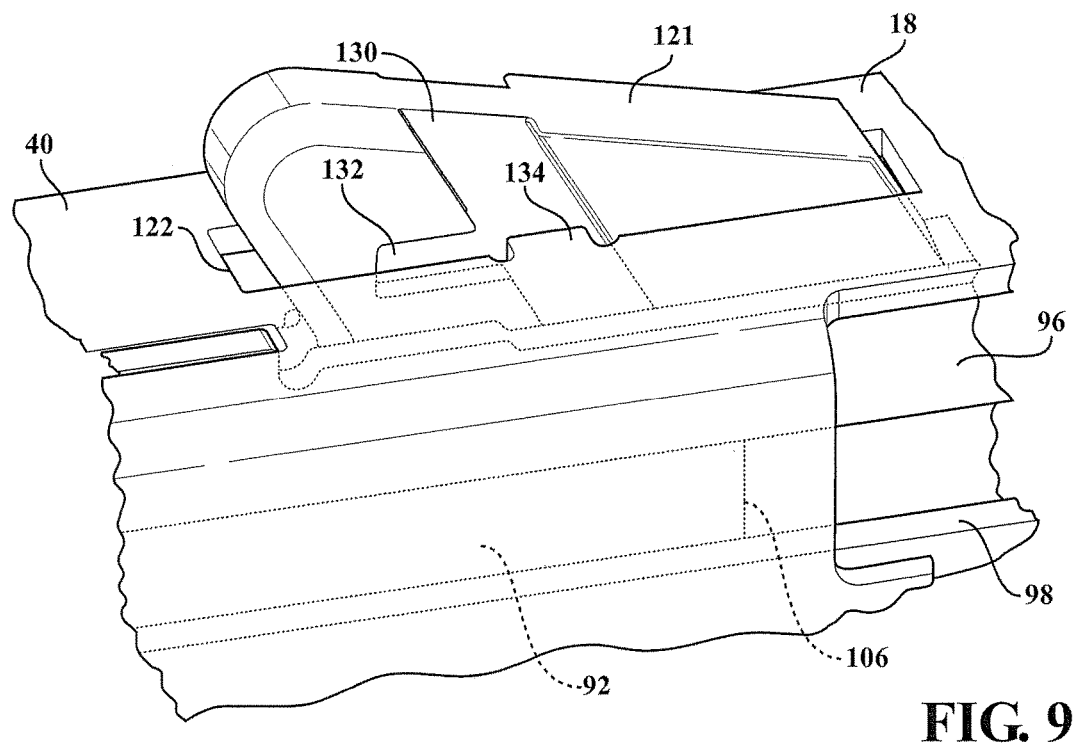
FIG. 9 is a fragmentary, inner perspective view of the primary seat track assembly illustrating the slider in the partially depressed position.

The movement of the slider 121 from the raised position to the depressed position also actuates the latch body 72 from the locked position to the unlocked position. A built-in delay function ensures the memory teeth 112 on the memory plate 92 are engaged with the tooth rack 94 prior to the latch body 72 being actuated to the unlocked position. More specifically, a rearward end 123 of the slider 121 includes a ramped edge 124 facing downward and the arm 88 of the latch release lever 84 includes a ramped edge 125 facing upward, the opposing ramped edges 124, 125 coming into contact as the slider 121 moves from the raised position to the depressed position, as shown in FIG. 8. The ramped edges 124, 125 are configured such that the slider 121 pivots the memory plate 92 to engage the memory teeth 112 with the tooth rack 94 before pivoting the latch release lever 84 to actuate the latch body 72 to the unlocked position. Further, as the ramped edge 124 at the rearward end 123 of the slider 121 comes into contact with the ramped edge 125 of the latch release lever 84, a forward end 126 of the slider 121 comes into contact with an upper edge 127 of the latch body 72 to prevent the slider 121 from pivoting.

At least one side of the slider 121 includes a first groove 130 extending downward and rearward at an angle that corresponds with the downward and rearward movement of the slider 121. A second groove 132 extending generally horizontally is interconnected with the first groove 130 generally midway between opposite ends of the first groove 130. The first groove 130 is aligned with a guide tab 134 formed along an edge of the opening 122 in the upper portion 40 of the movable track 18. As the cam lever 116 pushes the slider 121 downward and rearward, the guide tab 134 cooperates with the first 130 and second 132 grooves to guide the slider 121 from the raised position to the depressed position.

If the seat back 13 is pivoted to an upright position before the seat assembly 11 is returned to the previously selected fore/aft seating position, the cam lever 116 will pivot in a second direction about pivot 118 and the bias of the leaf spring 78 will tend to urge the latch body 72, the arm 88 of the latch release lever 84, and the slider 121 upward. This will result in the latch body 72 returning to the locked position before the seat assembly 11 is returned to the previously selected fore/aft seating position. However, an interlock assembly, generally shown at 142, is provided to prevent the seat back 13 from pivoting to the upright position before the seat assembly 11 is returned to the previously selected fore/aft seating position.

Figure 14:
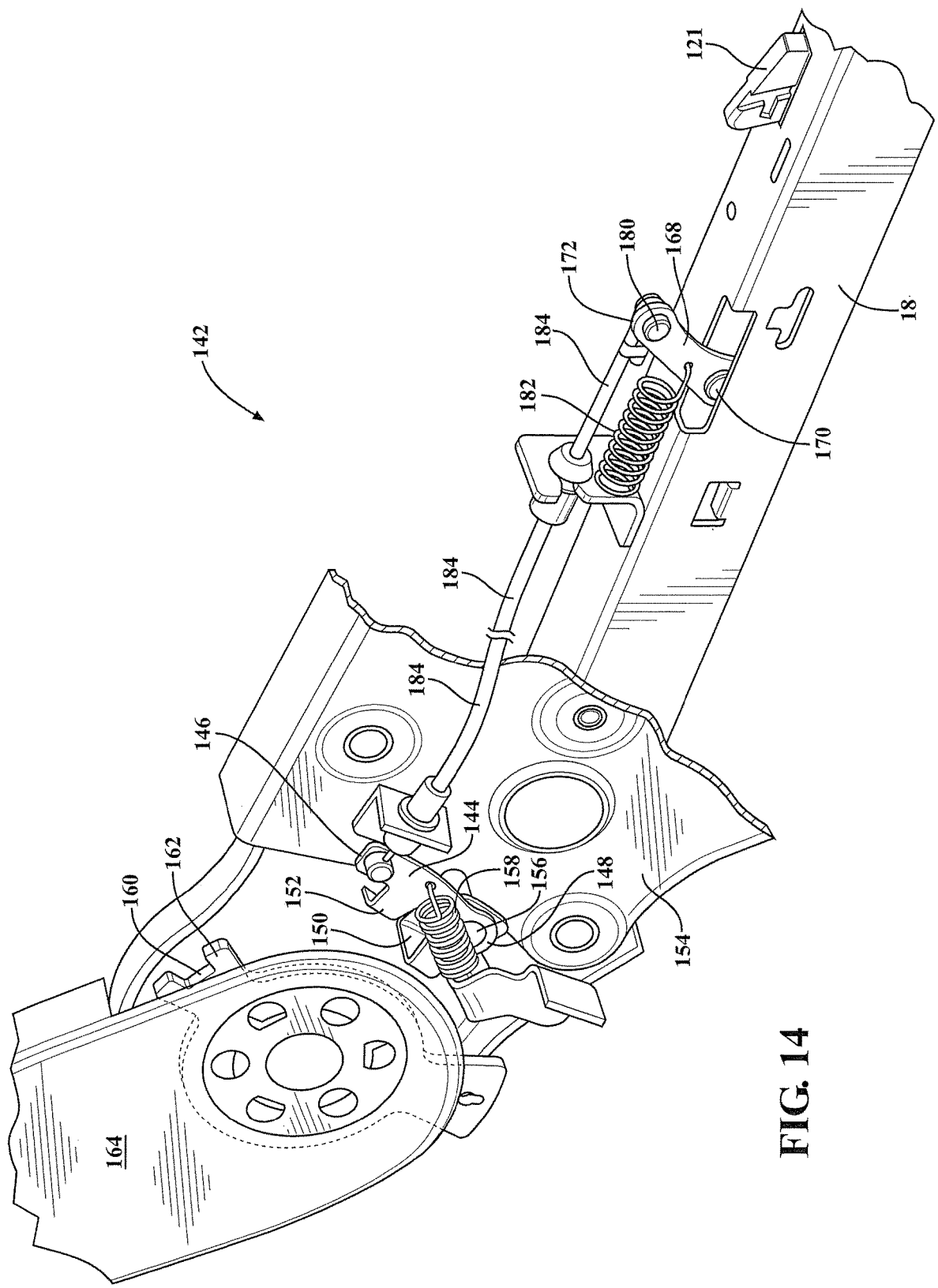
FIG. 14 is a fragmentary, perspective view of the seat assembly illustrating an interlock assembly including a hook lever pivoted away from engagement with a seat back bracket and an interlock lever in a disengaged position.
Figure 15:
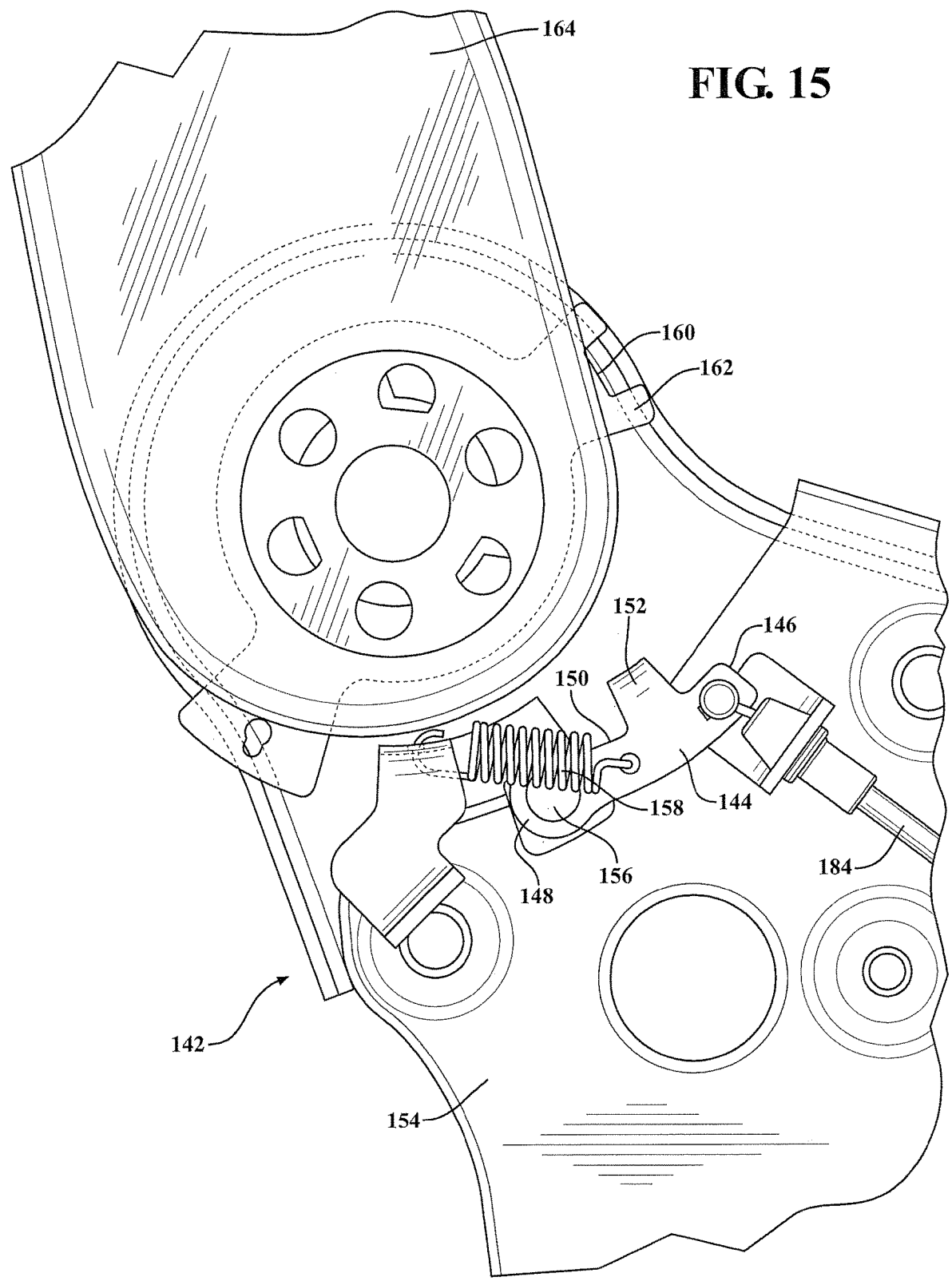
FIG. 15 is a fragmentary, outer side view of the seat assembly illustrating the hook lever disengaged from the seat back bracket.
Figure 16:
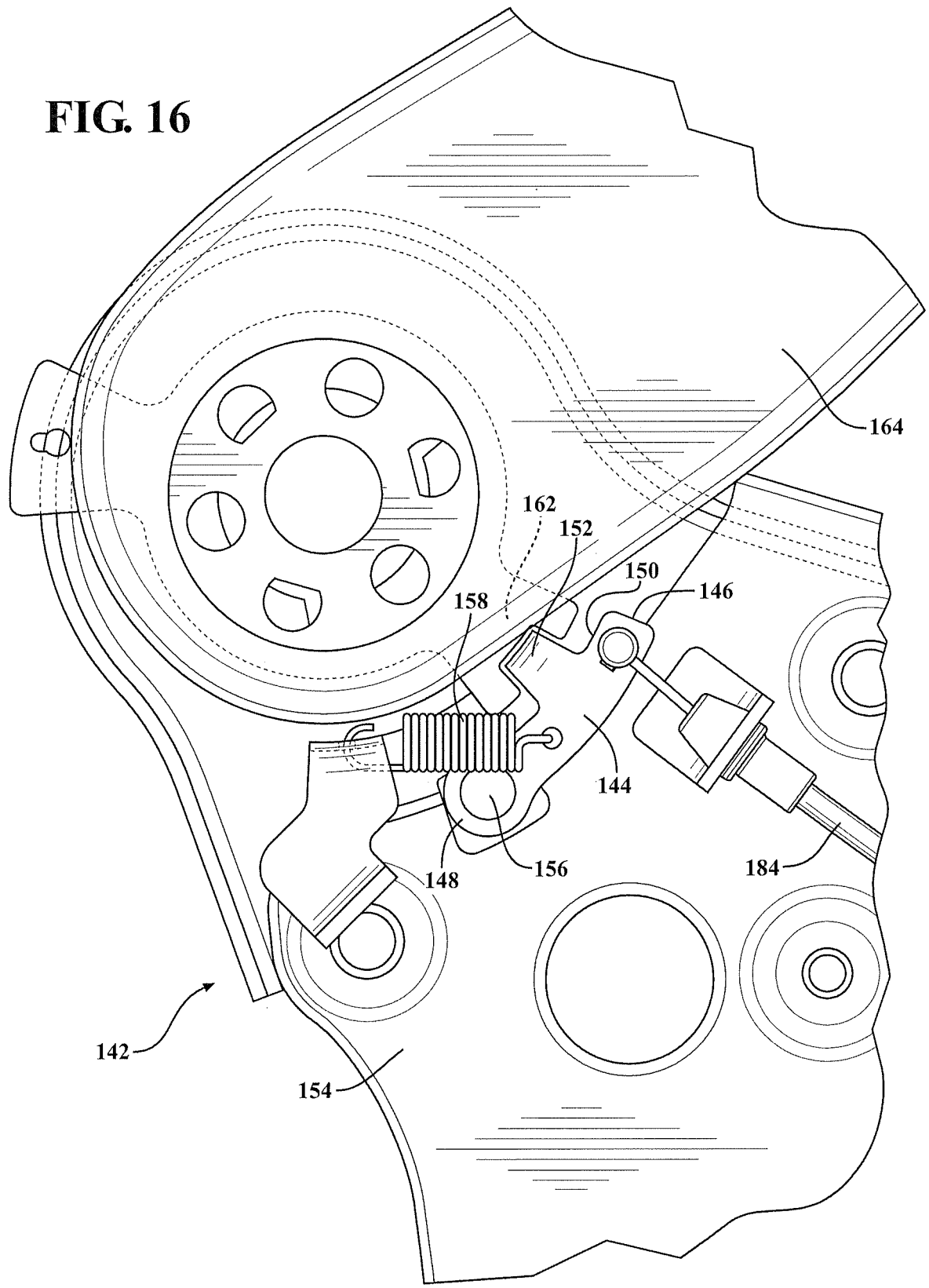
FIG. 16 is a fragmentary, outer side view of the seat assembly illustrating the hook lever engaged with the seat back bracket.

Referring to FIGS. 14-16, the interlock assembly 142 is operatively coupled between the seat back 13 and the primary seat track assembly 15. The interlock assembly 142 includes a hook lever 144 extending between a distal end 146 and a proximal end 148. An inner side 150 of the hook lever 144 includes a hook 152. At the proximal end 148, the hook lever 144 is pivotally coupled to a seat cushion bracket 154 at pivot 156. The hook lever 144 is biased by an extension spring 158 towards engagement with an opening 160 in a bracket 162 that is fixedly secured to a seat back bracket 164. Engagement of the hook 152 with the opening 160 when the seat back 13 is in the dumped position generally prevents the seat back 13 from pivoting to the upright position.

Referring to FIGS. 17-22, the interlock assembly 142 also includes an interlock lever 168 that is pivotally coupled to the guide bracket 96 by a pin 170 located between the forward end 100 of the guide slot 98 and the coil spring 114. The interlock lever 168 extends between an upper end 172 and a lower end 174, and includes a curved surface 176 and a downwardly extending flange 178 at the lower end 174. The interlock lever 168 includes a stud 180 towards the upper end 172. The interlock lever is configured to move between a disengaged position and an engaged position. An extension spring 182 is connected to the interlock lever 168 between the upper end 172 and the pin 170, and biases the interlock lever 168 toward the engaged position. A second Bowden-type cable 184 is operatively coupled between the distal end 146 of the hook lever 144 and the stud 180.

In operation, beginning with the memory plate 92 in the home position such that the memory teeth 112 are disengaged from the tooth rack 94, the primary seat track assembly 15 is freely adjustable to move the seat assembly 11 between the plurality of fore/aft seating positions by lifting the towel bar 80. When the towel bar 80 is lifted, the latch release lever 84 pivots about pivot 86 and the arm 88 pushes the latch body 72 downward from the locked position to the unlocked position. With the latch body 72 in the unlocked position, the loop latch 74 is disengaged from the latching teeth 76 on the fixed track 17 and the movable track 18 is free to slide relative to the fixed track 17. As the movable track 18 slides relative to the fixed track 17, the memory plate 92, which is in the home position, travels therewith. Once a particular fore/aft seating position is selected, the towel bar 80 is released and the leaf spring 78 returns the latch body 72 to the locked position. With the latch body 72 in the locked position, the loop latch 74 is engaged with the latching teeth 76 on the fixed track 17, thereby locking the movable track 18 relative to the fixed track 17.

Figure 17:
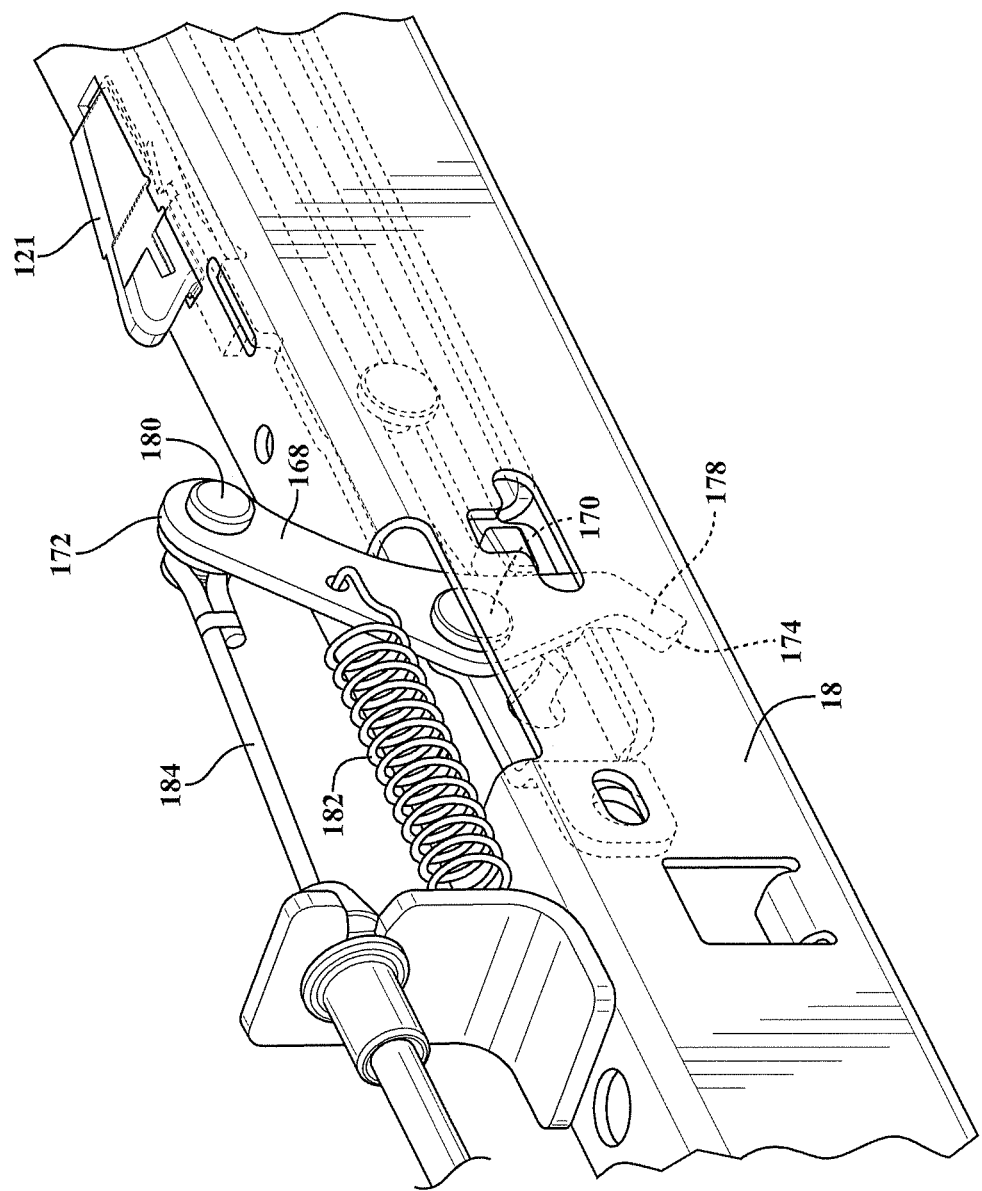
FIG. 17 is a fragmentary, inner perspective view of a portion of the primary seat track assembly with the memory plate in the home position and the interlock lever in the disengaged position.

When the memory plate 92 is in the home position, the memory tab 110 engages the curved surface 176 of the interlock lever 168 and maintains the interlock lever 168 in the disengaged position (see FIGS. 17, 19 and 21). With the interlock lever 168 in the disengaged position, a tension is applied to the second cable 184 such that the hook lever 144 is pivoted about pivot 156 against the bias of the extension spring 158 away from engagement with the opening 160 in the bracket 162, as shown in FIG. 15.

When ingress or egress to the rear seat assembly or access to the storage area is desired, the seat back 13 is actuated to the dumped position. As the seat back 13 pivots forward to the dumped position, the first cable 120 causes the cam lever 116 to pivot in the first direction about pivot 118. As the cam lever 116 pivots in the first direction, the cam lever 116 pushes the slider 121 downward and rearward and the guide tab 134 on the movable track 18 cooperates with the first 130 and second 132 grooves on the slider 121 to guide the slider 121 from the raised position to the depressed position. Movement of the slider 121 from the raised position to the depressed position pivots the memory plate 92 about pivot 108 from the home position to the memory position, wherein the memory teeth 112 are engaged with the tooth rack 94 to identify the previously selected fore/aft seating position. As the memory teeth 112 on the memory plate 92 engage with the tooth rack 94, the ramped edge 124 on the slider 121 comes into contact with the ramped edge 125 on the arm 88 and pivots the latch release lever 84 about pivot 86 to actuate the latch body 72 from the locked position to the unlocked position. With the memory plate 92 in the memory position and the latch body 72 in the unlocked position, the movable track 18 is allowed to slide forward relative to the fixed track 17 to move the seat assembly 11 from the previously selected fore/aft seating position to the easy-entry position.

Figure 18:
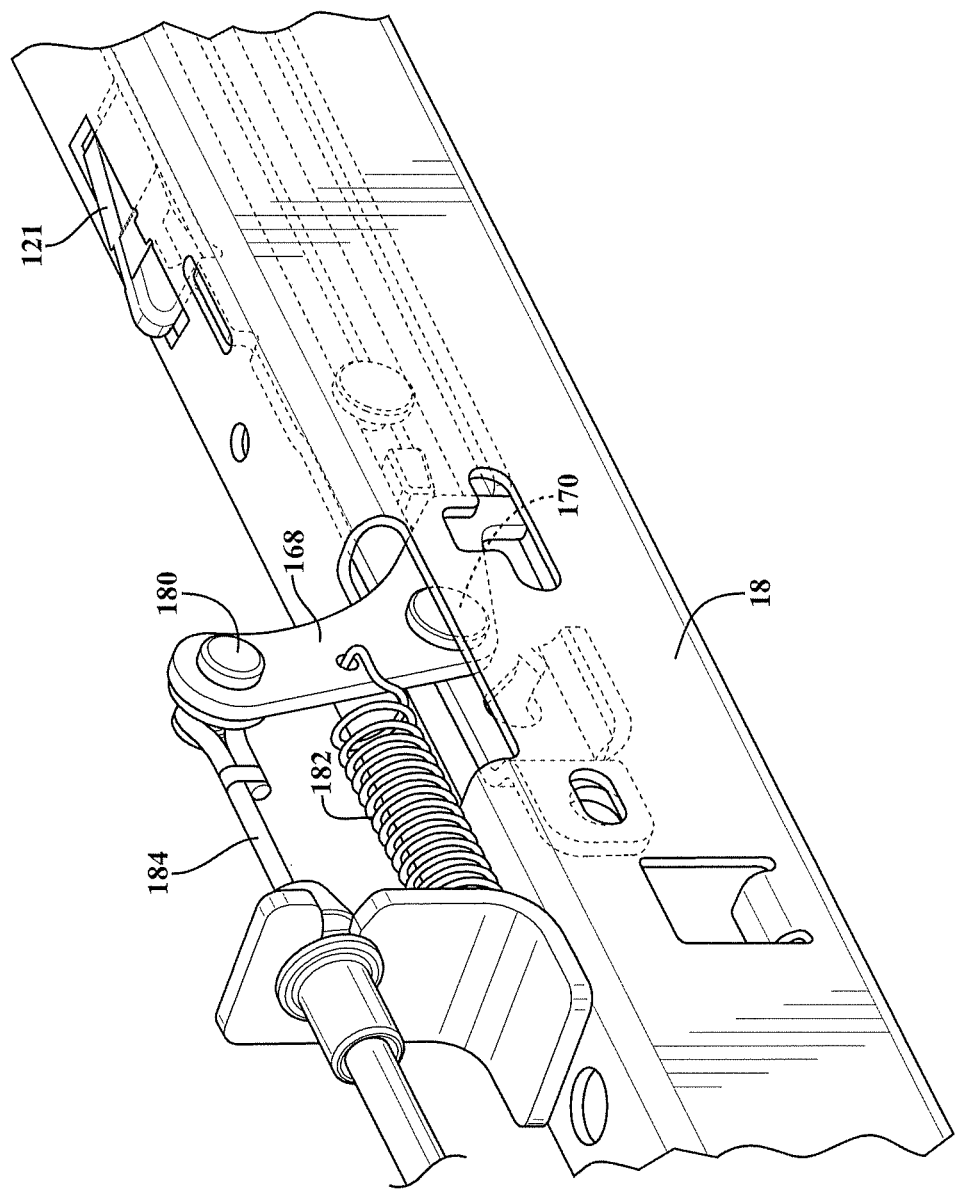
FIG. 18 is a fragmentary, inner perspective view of a portion of the primary seat track assembly with the memory plate in the memory position and the interlock lever in an engaged position.

As the movable track 18 slides forward, the memory plate 92 and the memory tab 110 remain stationary with the fixed track 17, which allows the extension spring 182 to move the interlock lever 168 to the engaged position (see FIGS. 18, 20 and 22). With the interlock lever 168 in the engaged position, the tension from the second cable 184 is released and the extension spring 158 pivots the hook lever 144 about pivot 156 to engage the hook 152 with the opening 160 in the bracket 162, as shown in FIG. 16. Thus, the seat back 13 is maintained in the dumped position while the seat assembly 11 travels between the previously selected fore/aft seating position and the easy-entry position.

To return the seat assembly 11 to the previously selected fore/aft seating position, a rearward force is typically applied to the seat back 13 and the movable track 18 is slid rearward relative to the fixed track 17 until the forward end 100 of the guide slot 98 contacts the memory tab 110 of the memory plate 92, which stops the seat assembly 11 in the previously selected fore/aft seating position. As the movable track 18 is slid rearward, the memory tab 110 also engages the curved surface 176 of the interlock lever 168, which causes the interlock lever 168 to move from the engaged position to the disengaged position. With the interlock lever 168 in the disengaged position, the tension is re-applied to the second cable 184 such that the hook lever 144 is pivoted about pivot 156 against the bias of the extension spring 158 to disengage the hook 152 from the opening 160 in the bracket 162. Continued rearward force applied to the seat back 13 pivots the seat back 13 to the upright position. As the seat back 13 pivots to the upright position, the cam lever 116 pivots in the second direction about pivot 118 and the bias of the leaf spring 78 moves the latch body 72 upward into the locked position. As the latch body 72 moves upward, the arm 88 of the latch release lever 84 moves the slider 121 upward into the raised position. At the same time, the coil spring 114 pushes the front end 104 of the memory plate 92 downward, which pivots the memory plate 92 about pin 108 until the memory tab 110 is disposed in the recess 103 on the guide bracket 96. The memory plate 92 is now in the home position and the movable track 18 is locked relative to the fixed track 17.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A seat assembly secured to a floor in an automotive vehicle, the seat assembly comprising:
a seat cushion;
a seat back operatively coupled to the seat cushion, the seat back movable between an upright position and a folded position;
a seat track assembly including a fixed track adapted to be fixedly secured to the floor and a movable track fixedly secured to the seat cushion and slidably coupled to the fixed track, the moveable track includes an elongated slot extending between first and second ends, the elongated slot having a recess at the first end;
a latch mechanism operatively coupled between the fixed and movable tracks, wherein the latch mechanism prevents sliding movement of the movable track and is selectively unlocked from the fixed track to allow sliding movement of the seat cushion between a plurality of positions;
a memory mechanism including a memory plate slideably coupled to the elongated slot, the memory plate having a memory tab extending laterally therefrom, the memory mechanism operable between a home position, wherein the memory mechanism is coupled and moves with the movable track, and a memory position, wherein the memory mechanism is coupled with the fixed track and defines a previously selected one of the plurality of positions; and
an interlock assembly comprising:
a hook lever pivotally connected to the seat cushion;
an interlock lever pivotally coupled to the movable track for movement between a disengaged position and an engaged position, the interlock lever extending between an upper end and a lower end and includes a curved surface extending between the upper and lower ends and a downwardly extending flange at the lower end; and
a cable operatively coupled between the hook lever and the interlock lever and configured for moving the hook lever into and out of engagement with the seat back;
wherein moving the seat back to the folded position actuates the memory mechanism to the memory position, thereby unlocking the latch mechanism from the fixed track to allow sliding movement of the seat cushion in a first direction away from the previously selected one of the plurality of positions to the easy-entry position;
wherein actuation of the memory mechanism to the memory position also allows the interlock lever to rotate into the engaged position to cause the cable to move the hook lever into engagement with the seat back to maintain the seat back in the folded position;
wherein sliding the movable track rearward causes the memory tab to engage with the curved surface of the interlock lever causing the interlock lever to move from the engaged position to the disengaged position; and
wherein when the memory plate is in the home position, the memory tab engages the curved surface of the interlock lever and maintains the interlock lever in the disengaged position.

2. The seat assembly of claim 1 wherein the memory plate is disengaged from the fixed track and the memory tab is disposed in the recess when the memory mechanism is in the home position and the memory plate is engaged with the fixed track and the memory tab is withdrawn from the recess when the memory mechanism is in the memory position.

3. The seat assembly of claim 2 wherein movement of the seat cushion in a second direction opposite the first direction is blocked at the previously selected one of the plurality of positions by the memory mechanism.

4. The seat assembly of claim 2 wherein the memory tab engages the curved portion of the interlock lever to rotate the interlock lever from the engaged position to the disengaged position to disengage the hook from the seat back in response to sliding movement of the seat cushion in the second direction.

5. The seat assembly of claim 4 wherein when the hook is disengaged from the seat back, moving the seat back from the folded position to the upright position allows the latch mechanism to engage with the fixed track and the memory mechanism to return to the home position.

6. The seat assembly of claim 1 wherein the latch mechanism is independently operable to disengage the latch mechanism from the fixed track when the memory mechanism is in the home position.

7. The seat assembly of claim 1 wherein the hook lever is disengaged from the seat back when the interlock lever is in the disengaged position and the hook lever is engaged with the seat back when the interlock lever is in the engaged position.

8. The seat assembly of claim 1 wherein the hook lever is biased towards engagement with the seat back and the interlock lever is biased towards the engaged position.

\* \* \* \* \*